L

(12) United States Patent
Furudate et al.

(10) Patent No.: US 8,986,580 B2
(45) Date of Patent: Mar. 24, 2015

(54) VISIBLE-LIGHT-RESPONSIVE TITANIUM OXIDE MICROPARTICLE DISPERSION, AND PROCESS FOR PRODUCTION THEREOF

(75) Inventors: Manabu Furudate, Kamisu (JP); Tomohiro Inoue, Kamisu (JP); Yoshitsugu Eguchi, Kamisu (JP); Tadashi Amano, Kamisu (JP)

(73) Assignee: Shin-etsu Chemical Co., Ltd., Tokyo (JP)

( * ) Notice: Subject to any disclaimer, the term of this patent is extended or adjusted under 35 U.S.C. 154(b) by 350 days.

(21) Appl. No.: 13/503,132

(22) PCT Filed: Mar. 11, 2011

(86) PCT No.: PCT/JP2011/055730
§ 371 (c)(1),
(2), (4) Date: Apr. 20, 2012

(87) PCT Pub. No.: WO2011/145385
PCT Pub. Date: Nov. 24, 2011

(65) Prior Publication Data
US 2012/0214667 A1 Aug. 23, 2012

(30) Foreign Application Priority Data

May 18, 2010 (JP) ................. 2010-114286
May 18, 2010 (JP) ................. 2010-114293

(51) Int. Cl.
| | | |
|---|---|---|
| C01G 23/053 | (2006.01) | |
| C01B 15/047 | (2006.01) | |
| C01G 23/047 | (2006.01) | |
| C09C 1/36 | (2006.01) | |
| B01J 37/03 | (2006.01) | |
| B01J 37/10 | (2006.01) | |
| B01J 21/06 | (2006.01) | |
| B01J 23/835 | (2006.01) | |
| B01J 35/00 | (2006.01) | |
| B01J 35/08 | (2006.01) | |

(52) U.S. Cl.
CPC ......... C01G 23/047 (2013.01); C01P 2004/04 (2013.01); C01P 2006/60 (2013.01); C09C 1/3653 (2013.01); B01J 37/031 (2013.01); B01J 37/10 (2013.01); B01J 21/063 (2013.01); B01J 23/835 (2013.01); B01J 35/004 (2013.01); B01J 35/006 (2013.01); B01J 35/08 (2013.01)
USPC ...... 252/520.21; 252/588; 423/610; 427/212; 428/403; 502/350

(58) Field of Classification Search
CPC ........ B01J 21/06; B01J 21/063; B01J 35/002; B01J 35/004; B01J 35/02; B01J 23/14; B01J 37/34; B01J 37/344; B01J 37/08; C01G 23/04; C01G 23/047; C01G 23/053; C01G 19/02; B82Y 30/00; C01P 2004/64
USPC ............ 502/349–352; 423/593.1, 598, 594.9, 423/608, 610; 252/520.1, 520.2, 521.5; 977/811, 896, 773; 106/436
See application file for complete search history.

(56) References Cited

U.S. PATENT DOCUMENTS 5,049,309 A 9/1991 Sakamoto et al.

FOREIGN PATENT DOCUMENTS

| | | | |
|---|---|---|---|
| JP | 64-3020 A | 1/1989 | |
| JP | 6-279725 A | 10/1994 | |
| JP | 7-247119 A | 9/1995 | |
| JP | 7-286114 A | 10/1995 | |
| JP | 11-188270 A | 7/1999 | |
| JP | 11188270 * | 7/1999 | ............... B01J 35/02 |
| JP | 2003-160745 A | 6/2003 | |
| JP | 2009-148700 A | 7/2009 | |
| JP | 2009-285528 A | 12/2009 | |
| JP | 2010-412 A | 1/2010 | |
| JP | 2011-56469 A | 3/2011 | |

OTHER PUBLICATIONS

International Search Report, issued in PCT/JP2011/055730, dated, May 17, 2011.

* cited by examiner

*Primary Examiner* — Stanley Silverman
*Assistant Examiner* — Kallambella Vijayakumar
(74) *Attorney, Agent, or Firm* — Birch, Stewart, Kolasch & Birch, LLP

(57) ABSTRACT

Disclosed are: a visible-light-responsive titanium oxide microparticle dispersion comprising an aqueous dispersion medium and titanium oxide microparticles dispersed therein, and a peroxotitanium component, an iron component and/or a copper component and a tin component, wherein the content of the peroxotitanium component is 0.1 to 20 mass % relative to the titanium oxide content; and a process for producing a visible-light-responsive titanium oxide microparticle dispersion, comprising (1) producing peroxotitanic acid containing a tin compound from a raw material titanium compound, a tin compound and hydrogen peroxide, (2) heating an aqueous solution of peroxotitanic acid containing the tin compound to 80 to 250° C. under a high pressure to produce a titanium oxide microparticle dispersion containing a peroxotitanium component and a tin component, and (3) adding an iron compound and/or a copper compound to the titanium oxide microparticle dispersion to cause a reaction between the iron compound and/or the copper compound with the dispersion.

6 Claims, No Drawings

VISIBLE-LIGHT-RESPONSIVE TITANIUM OXIDE MICROPARTICLE DISPERSION, AND PROCESS FOR PRODUCTION THEREOF

TECHNICAL FIELD

The present invention relates to a visible-light-responsive titanium oxide microparticle dispersion and a method for production thereof. More specifically, the invention relates to a visible-light-responsive titanium oxide dispersion in which titanium oxide microparticles are dispersed highly stably and which enables easy production of a photocatalyst thin film having responsiveness to visible light and high transparency and a method for production of the visible-light-responsive titanium oxide dispersion.

Titanium oxide has been used for a variety of uses such as pigment, UV-screening agent, catalyst, photocatalyst, catalyst support, adsorbent, ion exchange agent, filler, reinforcement agent, raw material for ceramics, precursor of composite oxides such as perovskite composite oxides, and undercoating agent in magnetic tape.

Among them, photocatalytic titanium oxide microparticles are widely used for such uses as cleaning of a substrate surface, deodorization and antibacterial treatment, since photocatalytic coating films formed by coating surfaces of various substrates with a dispersion of photocatalytic titanium oxide microparticles decompose organic matter by a photocatalytic action of titanium oxide to render the film surface hydrophilic. In order to enhance the photocatalytic activity, it is necessary to enlarge the area of contact between the photocatalyst particles and the material to be decomposed, so that the primary particle diameter of the particles must be not more than 50 nm. Furthermore, film transparency is also demanded so as not to lose design properties of the substrate.

Examples of the method for production of a titanium oxide microparticle dispersion include (1) a method in which a titanium oxide fine powder is dispersed in a dispersion solvent by a wet dispersing machine using a dispersion aid such as an organic polymer dispersion aid (Patent Documents 1 to 3), and (2) a liquid phase method in which a solution of a titanium-containing compound is subjected to a hydrothermal treatment (Patent Document 4). These production methods have a problem in that since ultrafine particles with a mean particle diameter of not more than 50 nm are liable to aggregation, much labor is needed for dispersing the titanium oxide microparticles down to primary particles, and it may be impossible to disperse the titanium oxide microparticles down to the primary particles.

In addition, although titanium oxide shows good photocatalytic action under irradiation with light in a UV region of a comparatively short wavelength such as sunlight, it may fail to exhibit a sufficient photocatalytic action in a room space irradiated by a source of light composed mostly of visible light such as a fluorescent light. In recent years, a tungsten oxide photocatalyst has been drawing attention as a visible-light-responsive photocatalyst (Patent Document 4). However, since tungsten is a rare element, it has been desired to enhance visible-light activity of a photocatalyst based on the use of titanium which is a wide-use element.

PRIOR-ART DOCUMENTS

Patent Documents

Patent Document 1: JP-A H01-003020
Patent Document 2: JP-A H06-279725
Patent Document 3: JP-A H07-247119
Patent Document 4: JP-A 2009-148700

SUMMARY OF THE INVENTION

Problems to be Solved by the Invention

The present invention has been made in consideration of the above-mentioned circumstances. Accordingly, it is an object of the present invention to provide a visible-light-responsive titanium oxide dispersion in which titanium oxide microparticles are dispersed highly stably and which enables easy production of a photocatalyst thin film having responsiveness to visible light and high transparency, and a process for production of the visible-light-responsive titanium oxide dispersion.

Means for Solving the Problems

The present inventors made earnest investigations for attaining the above object. As a result of the investigations, the inventors found out that when a process of producing an aqueous solution of peroxotitanic acid containing a tin compound by using a raw material titanium compound, a tin compound and hydrogen peroxide, thereafter subjecting the aqueous solution of peroxotitanic acid to a hydrothermal reaction under a high pressure to obtain a titanium oxide microparticle dispersion, and then adding an iron compound and/or a copper compound to react them with the titanium oxide microparticle dispersion is conducted, a titanium oxide microparticle dispersion containing a peroxotitanium component, a tin component, and an iron component and/or a copper component can be obtained. It is also found that the titanium oxide dispersion contains the titanium oxide microparticles dispersed therein highly stably and enables easy production therefrom of a photocatalyst thin film having responsiveness to visible light and high transparency. Based on the findings, the present inventors have completed the present invention.

Thus, according to the present invention, there is provided the following visible-light-responsive titanium oxide dispersion and the following process for production of the visible-light-responsive titanium oxide dispersion.

[1] A visible-light-responsive titanium oxide microparticle dispersion including an aqueous dispersion solvent and titanium oxide microparticles dispersed in the aqueous dispersion solvent and additionally including a peroxotitanium component, a tin component, and an iron component and/or a copper component, wherein the content of the peroxotitanium component is 0.1 to 20 wt % based on titanium oxide.

[2] The visible-light-responsive titanium oxide microparticle dispersion according to the above paragraph [1], wherein the content of the iron component in terms of metal iron is 0.01 to 5 wt % based on titanium oxide.

[3] The visible-light-responsive titanium oxide microparticle dispersion according to the above paragraph [1], wherein the content of the copper component in terms of metal copper is 0.01 to 5 wt % based on titanium oxide.

[4] The visible-light-responsive titanium oxide microparticle dispersion according to any one of the above paragraphs [1] to [3], wherein the content of the tin component in terms of molar ratio (Ti/Sn) between the tin component and titanium oxide is from 1 to 1000.

[5] The visible-light-responsive titanium oxide microparticle dispersion according to any one of the above paragraphs [1] to [4], wherein the titanium oxide microparticles have a 50% cumulative distribution diameter ($D_{50}$) measured by a dynamic scattering method of not more than 50 nm.

[6] A process for producing the visible-light-responsive titanium oxide microparticle dispersion according to any one of paragraphs [1] to [5], including the steps of:

(1) producing an aqueous solution of peroxotitanic acid containing a tin compound from a raw material titanium compound, a tin compound and hydrogen peroxide;

(2) heating the aqueous solution of peroxotitanic acid containing the tin compound to 80 to 250° C. under a high pressure to produce a titanium oxide microparticle dispersion containing a peroxotitanium component and a tin component; and (3) adding an iron compound and/or a copper compound to the titanium oxide microparticle dispersion to cause a reaction of the iron compound and/or the copper compound with the dispersion.

Advantageous Effects of the Invention

According to the present invention, it is possible to provide a visible-light-responsive titanium dispersion in which titanium oxide microparticles are dispersed highly stably and which enables easy production of a photocatalyst thin film having responsiveness to visible light and high transparency, and a method for production of the visible-light-responsive titanium oxide dispersion.

EMBODIMENT FOR CARRYING OUT THE INVENTION

The present invention will be described more in detail below.

<Visible-Light-Responsive Titanium Oxide Microparticle Dispersion>

The visible-light-responsive titanium oxide microparticle dispersion according to the present invention contains titanium oxide microparticles highly dispersed in an aqueous solvent, and further contains a peroxotitanium component, a tin component, and an iron component and/or a copper component.

Aqueous Dispersion Solvent

As an aqueous dispersion solvent, an aqueous solvent is used. Examples of the aqueous solvent include water and mixed solvent of water with hydrophilic organic solvent in arbitrary ratio. Preferred examples of water include deionized water, distilled water and pure water. Preferred examples of the hydrophilic organic solvent include alcohol such as methanol, ethanol and isopropanol. In this case, the mixing ratio of the hydrophilic organic solvent is preferably 0 to 50 wt % based on the aqueous dispersion solvent.

Titanium Oxide Microparticles

The titanium oxide microparticles dispersed in the aqueous dispersion solvent preferably has a 50% accumulative distribution diameter ($D_{50}$) on a volume basis measured by a dynamic scattering method using a laser beam (hereafter, referred to as "mean particle diameter") of not more than 50 nm, more preferably not more than 30 nm. Normally, the lower limit for the diameter is not particularly restricted, but the value is preferably not less than 5 nm.

The concentration of the titanium oxide microparticles is preferably 0.01 to 20 wt %, particularly 0.5 to 10 wt %, based on the dispersion, from the viewpoint of ease of formation of a photocatalyst thin film having a required thickness.

Peroxotitanium Component

The "peroxotitanium component" here means a titanium oxide compound containing Ti—O—O—Ti bonds, and includes peroxotitanic acid and a peroxotitanium complex produced by a reaction between Ti(VI) and hydrogen peroxide.

In the titanium oxide microparticle dispersion of the present invention, the peroxotitanium component has an action of favorably dispersing titanium oxide. The concentration of the peroxotitanium component is 0.1 to 20 wt %, preferably 0.1 to 5 wt %, based on the titanium oxide microparticles. If the concentration is less than 0.1 wt %, aggregation of the titanium oxide microparticles is liable to occur. If the concentration exceeds 20 wt %, on the other hand, the photocatalytic effect of the photocatalyst thin film obtained from the dispersion may be insufficient.

Iron Component

The iron component has an action of enhancing decomposition activity of the photocatalyst thin film. The form in which the iron component exists is not particularly restricted; for example, the iron component may be in the form of any of metal iron, oxide, hydroxide, nitrate, sulfate, halide and complex compound. At least a part of the iron component is preferably supported on surfaces of the titanium oxide microparticles, and the other part is preferably dissolved and/or dispersed in the dispersion.

The content of the iron component in terms of metal iron is preferably 0.01 to 5 wt %, particularly preferably 0.1 to 2 wt %, based on the titanium oxide microparticles. If the content of the iron component is too high, the photocatalytic activity may not be exhibited sufficiently.

Copper Component

The copper component also has an action of enhancing the decomposition activity of the photocatalyst thin film obtained. The form in which the copper component exists is not specifically restricted; for example, the copper component may be any of metal copper, oxide, hydroxide, nitrate, sulfate, halide and complex compound. At least a part of the copper component is preferably supported on surfaces of the titanium oxide microparticles, and the other part is preferably dissolved and/or dispersed in the dispersion.

The content of the copper component in terms of metal copper is preferably 0.01 to 5 wt %, particularly preferably 0.1 to 2 wt %, based on the titanium oxide microparticles. If the content of the copper component is too high, the photocatalytic activity may not be exhibited sufficiently.

Tin Component

The tin component has an action of enhancing the responsiveness to visible light of the photocatalyst thin film obtained. The form in which the tin component exists is not specifically restricted; for example, the tin component may be any of metal tin, oxide, hydroxide, nitrate, sulfate, halide and complex compound. At least a part of the tin component is preferably doped in the titanium oxide microparticles or supported on surfaces of the titanium oxide microparticles, and the other part is preferably dissolved and/or dispersed in the dispersion.

The tin component is contained in a molar ratio (Ti/Sn) between the tin component and titanium oxide of preferably from 1 to 1000, particularly preferably from 5 to 200, and more preferably from 10 to 100. When the molar ratio exceeds 1000, the effect of containing of the tin compound is insufficient. If the molar ratio is less than 1, on the other hand, the titanium oxide content ratio may be lowered, and the photocatalytic effect may not be exhibited sufficiently.

<Process for Production of Visible-Light-Responsive Titanium Oxide Microparticle Dispersion>

The titanium oxide microparticle dispersion as above can be produced by a production process having the steps of:

(1) producing an aqueous solution of peroxotitanic acid containing a tin compound from a raw material titanium compound, a tin compound and hydrogen peroxide;

(2) heating the aqueous solution of peroxotitanic acid containing the tin compound to 80 to 250° C. under a high pressure to convert the aqueous solution to a titanium oxide microparticle dispersion; and (3) adding an iron compound and/or a copper compound to the titanium oxide microparticle dispersion to cause reaction of the iron compound and/or the copper compound with the titanium oxide microparticle dispersion.

Step (1)

In the step (1), the raw material titanium compound, the tin compound and hydrogen peroxide are reacted with each other to produce the aqueous solution of peroxotitanic acid to containing the tin compound. As the method for the reaction, there may be used a method in which a basic substance is added to the raw material titanium compound to form titanium hydroxide, impurity ions contained in the titanium hydroxide are removed, hydrogen peroxide is added to the titanium hydroxide to form peroxotitanic acid, and addition of the tin compound is conducted to form the aqueous solution of tin-containing peroxotitanic acid. There may also be used a method in which the tin compound is added to the raw material titanium compound, thereafter addition of a basic acid is conducted to form tin-containing titanium hydroxide, impurity ions contained in the tin-containing titanium compound are removed, and addition of hydrogen peroxide is conducted to form the aqueous solution of tin-containing peroxotitanic acid.

Examples of the raw material titanium compound to be used as a raw material in the step (1) include: inorganic acid salts such as hydrochloride, nitrate and sulfate of titanium; salts of organic acids such as formic acid, citric acid, oxalic acid, lactic acid and glycolic acid; and titanium hydroxide deposited by adding an alkali to aqueous solutions of these salts to effect hydrolysis. These raw material titanium compounds may be used in combination of two or more of them. The concentration of the aqueous solution of the raw material titanium compound is preferably not more than 60 wt %, particularly preferably not more than 30 wt %. Incidentally, the lower limit for the concentration is selected appropriately, and the concentration is preferably not less than 1 wt %.

The aqueous solution of peroxotitanic acid containing the tin compound as above may contain a basic or acidic substance, for pH control or the like. Examples of the alkaline substance include ammonia, sodium hydroxide and calcium hydroxide. Examples of the acidic substance include inorganic acids such as sulfuric acid, nitric acid, hydrochloric acid, carbonic acid, phosphoric acid and hydrogen peroxide, and organic acids such as formic acid, citric acid, oxalic acid, lactic acid and glycolic acid.

In the step (1), the amount of the tin compound to be used is as above-mentioned, and the amount of hydrogen peroxide used is preferably 1.5 to 5 times by mol of the total number of mols of Ti and Sn. Besides, the reaction temperature in the reaction conducted by addition of hydrogen peroxide so as to convert the raw material titanium compound or titanium hydroxide to peroxotitanic acid is preferably 5 to 60° C., and the reaction time is preferably 30 minutes to 24 hours.

Incidentally, examples of the basic substance added for converting the raw material titanium compound to titanium hydroxide include hydroxides of alkali metal or alkaline earth metal such as sodium hydroxide and potassium hydroxide, as well as ammonia, alkanolamines and alkylamines. The basic substance is used by addition thereof in such an amount that the aqueous solution of the raw material titanium compound will have a pH of not less than 7.

Besides, the pH of the aqueous solution of peroxotitanic acid containing the tin compound thus obtained is preferably 1 to 7, particularly 4 to 7, from the viewpoint of safety in handling the aqueous solution.

Step (2)

In the step (2), the aqueous solution of peroxotitanic acid containing the tin compound is subjected to a hydrothermal reaction at a temperature of 80 to 250° C., preferably 120 to 250° C. under a high pressure. The reaction temperature is suitably 80 to 250° C., from the viewpoint of reaction efficiency and reaction controllability. As a result of this reaction, peroxotitanic acid is converted to titanium oxide microparticles.

In this case, the pressure is preferably a high pressure of about 0.01 to 4.5 MPa, particularly a high pressure of about 0.15 to 4.5 MPa, and the reaction time is preferably 1 minute to 24 hours.

By the step (2), a titanium oxide microparticle dispersion containing the peroxotitanium component and the tin component is obtained.

Step (3)

In the step (3), the iron compound and/or the copper compound is added to the titanium oxide microparticle dispersion obtained in the step (2) to effect a reaction. As the reaction method, there may be used a method in which the iron compound and/or the copper compound is added to the titanium oxide microparticle dispersion, followed by stirring at normal temperature, or a method in which the iron compound and/or the copper compound is added to the titanium oxide microparticle dispersion, followed by a hydrothermal treatment at a temperature of 80 to 250° C. In this case, the reaction time is preferably 1 minute to 3 hours.

Examples of the iron compound to be used as a raw material in the step (3) include: inorganic acid salts such as hydrochloride, nitrate and sulfate of iron; iron salts of organic acids such as formic acid, citric acid, oxalic acid, lactic acid and glycolic acid; iron hydroxide deposited by adding an alkali to aqueous solutions of these salts to effect hydrolysis of the salts; and complexes such as iron-tetraammine complex. These iron compounds may be used in combination of two or more of them.

On the other hand, examples of the copper compound to be used as a raw material in the step (3) include: inorganic acid salts such as hydrochloride, nitrate and sulfate of copper; copper salts of organic acids such as formic acid, citric acid, oxalic acid, lactic acid and glycolic acid; copper hydroxide deposited by addition of an alkali to aqueous solutions of these salts to effect hydrolysis of the salts; and complexes such as copper-tetraammine complex. These copper compounds may be used in combination of two or more of them.

The titanium oxide microparticle dispersion obtained as above can be used to form a photocatalyst film on surfaces of various substrates, for example, inorganic substrates such as glass or organic substrates such as polyester film. In this case, as for the method for forming the photocatalyst film, it suffices to conduct coating and drying by a known method. The thickness of the photocatalyst film may be selected from various values, and the thickness is normally in the range of 50 nm to 10 μm. The photocatalyst film thus formed is transparent, provides a good photocatalytic action in UV region in the same manner as in the related art, and further, is excellent also in responsiveness to visible light.

EXAMPLES

The present invention will be specifically described below by showing Examples and Comparative Examples, but the invention is not to be restricted to the following Examples. Incidentally, various measurements in the present invention were conducted as follows.

(1) Mean Particle Diameter ($D_{50}$) of Titanium Oxide Microparticles in Dispersion The mean particle diameter ($D_{50}$) of titanium oxide microparticles in the dispersion was measured by use of the particle size distribution measuring instrument (product name: "Nanotrac particle analyzer UPA-EX" made by Nikkiso Co., Ltd.).

(2) Transparency of Photocatalyst Thin Film

The haze value (%) of a glass plate as a substrate is measured. Next, a dispersion is applied to the glass plate, followed by drying to form a photocatalyst thin film, and the haze value of the glass plate with the thin film formed thereon is measured. From the difference between the two haze values measured, the haze value of the photocatalyst thin film is calculated. The measurement of haze value was conducted by use of the haze meter (product name: "Digital Haze Meter NDH-200" made by Nippon Denshoku Industries Co., Ltd.). The transparency of the photocatalyst thin film was evaluated from the haze value difference thus obtained, according to the following criterion.

Good (marked as O): difference is not more than +1%
Somewhat bad (marked as Δ): difference is more than +1% and not more than +3%
Bad (marked as x): difference is more than +3%

(3) Acetaldehyde Gas Decomposition Test (Under Irradiation with Visible Light) of Photocatalyst Thin Film The activity of the photocatalyst thin film produced by applying and drying the dispersion was evaluated by an acetaldehyde gas decomposition reaction. The evaluation was conducted by a circulation-type gas decomposition performance evaluation method. Specifically, an evaluation sample that a photocatalyst thin film was formed on the substrate consisting of 5 cm square-shaped flat glass was disposed in the quartz glass cell of volume 12.5 $cm^3$, and while circulating the acetaldehyde gas of concentration 250 ppm and conditioned humidity 50% in the cell, irradiation with light was conducted by the fluorescent lamp disposed at the upper portion in the cell so that the illuminance of 8000 lux was obtained. When the acetaldehyde gas is decomposed by the photocatalyst on the thin film, the concentration of the acetaldehyde gas in the gas flowing out of the cell is lowered. By measuring the concentration, therefore, it is possible to determine the amount of acetaldehyde gas decomposed. The concentration of acetaldehyde gas was measured by use of the gas chromatograph (product name: "GC-8A" made by Shimadzu Corp.).

(4) Self-Cleaning Performance Test (Under Irradiation with Visible Light) of Photocatalyst Thin Film The activity of a photocatalyst thin film produced by applying the dispersion to the slide glass and drying the dispersion was evaluated by a decomposition reaction of oleic acid.

Specifically, 0.5 wt % oleic acid was applied to a thin film surface by the dip coater, and was dried to obtain a sample for evaluation of photocatalytic activity. Each sample was irradiated with light from the fluorescent lamp, at illuminance 10,000 lux. As the oleic acid on the thin film surface is decomposed, the thin film surface is turned to be hydrophilic, and water contact angle decreases gradually. In view of this, the water contact angle on the sample surface is measured at time intervals of an hour. The water contact angle was measured by use of the contact angle meter (product name: "CA-A" made by Kyowa Interface Science Co., Ltd.).

Example 1

(1) Tin(IV) chloride was added to 36 wt % aqueous solution of titanium(IV) chloride so as to obtain Ti/Sn (molar ratio) of 20, and after diluting the aqueous solution with pure water by the dilution ratio of 10 times, 10 wt % aqueous ammonia was gradually added to the aqueous solution to effect neutralization and hydrolysis, thereby obtaining a precipitate of titanium hydroxide. The pH of the solution in this instance was 9. The precipitate of titanium hydroxide thus obtained was subjected to the deionization treatment by repeating pure water addition and decantation. 30 wt % aqueous solution of hydrogen peroxide was added to the titanium hydroxide precipitate after the deionization treatment so as to obtain hydrogen peroxide/titanium hydroxide ratio (molar ratio) of not less than 2.5, followed by stirring at room temperature for one whole day and night to cause sufficient reaction. Thereafter, concentration adjustment was conducted by addition of pure water, to obtain a yellow transparent tin-containing peroxotitanic acid solution (a) (solid content concentration: 1 wt %).

(2) Iron sulfate was dissolved in pure water, to obtain 1 wt % aqueous iron sulfate solution (b).

(3) The autoclave of volume 500 mL was charged with 400 mL of the tin-containing aqueous peroxotitanic acid solution (a) obtained in (1), and the solution was subjected to the hydrothermal treatment under 200° C. and 1.6 MPa for 120 min. Thereafter, the reaction mixture in the autoclave was discharged through the sampling pipe into the vessel held in 25° C. water bath to effect rapid cooling, thereby stopping the reaction, to obtain a titanium oxide microparticle dispersion.

The titanium oxide microparticle dispersion obtained in (3) was admixed with the aqueous iron sulfate solution (b) obtained in (2) so as to obtain the metal iron concentration of 0.2 wt %. The admixture was subjected to the hydrothermal treatment under 150° C. for 30 min, to obtain a visible-light-responsive titanium oxide microparticle dispersion (A) of the present invention which contains the titanium oxide of 1 wt % and contains the peroxotitanium component of concentration 1 wt % based on the titanium oxide. The mean particle diameter of the titanium oxide microparticles in the dispersion thus obtained was measured to be 20 nm.

Example 2

(4) Tin(IV) chloride was added to 36 wt % aqueous titanium(IV) chloride solution so as to obtain Ti/Sn (molar ratio) of 5, and after diluting the aqueous solution with pure water by the dilution ratio of 10 times, 10 wt % aqueous ammonia was gradually added to the aqueous solution to effect neutralization and hydrolysis, thereby obtaining a precipitate of titanium hydroxide. The pH of the solution in this instance was 9. The precipitate of titanium hydroxide thus obtained was subjected to the deionization treatment by repeating pure water addition and decantation. 30 wt % aqueous solution of hydrogen peroxide was added to the titanium hydroxide precipitate after the deionization treatment so as to obtain hydrogen peroxide/titanium hydroxide ratio (molar ratio) of not less than 2.5, followed by stirring at room temperature for one whole day and night to cause sufficient reaction. Thereafter, concentration adjustment was conducted by addition of pure water, to obtain a yellow transparent tin-containing peroxotitanic acid solution (c) (solid content concentration: 1 wt %).

(5) Iron nitrate was dissolved in pure water, to obtain 1 wt % aqueous iron nitrate solution (d).

(6) The autoclave of volume 500 mL was charged with 400 mL of the tin-containing aqueous peroxotitanic acid solution (c) obtained in (4), and the solution was subjected to the hydrothermal treatment under 150° C. and 0.5 MPa for 120 min. Thereafter, the reaction mixture in the autoclave was discharged through the sampling pipe into the vessel held in a 25° C. water bath to effect rapid cooling, thereby stopping the reaction, to obtain a titanium oxide microparticle dispersion.

The titanium oxide microparticle dispersion obtained in (6) was admixed with the aqueous iron sulfate solution (d) obtained in (5) so as to obtain the metal iron concentration of 0.25 wt % based on the titanium oxide, to obtain a visiblelight-responsive titanium oxide microparticle dispersion (B) of the present invention which contains the titanium oxide of 1 wt % and contains the peroxotitanium component of concentration 2 wt % based on the titanium oxide. The mean particle diameter of the titanium oxide microparticles in the dispersion thus obtained was measured to be 24 nm.

Example 3

(7) After 36 wt % aqueous titanium(IV) chloride solution was diluted with pure water by the dilution ratio of 10 times, 10 wt % aqueous ammonia was gradually added to the aqueous solution to effect neutralization and hydrolysis, to obtain a precipitate of titanium hydroxide. The pH of the solution in this instance was 10. The precipitate of titanium hydroxide thus obtained was subjected to the deionization treatment by repeating pure water addition and decantation. 30 wt % aqueous solution of hydrogen peroxide was added to the titanium hydroxide precipitate after the deionization treatment so as to obtain hydrogen peroxide/titanium hydroxide ratio (molar ratio) of not less than 2.5, followed by stirring at room temperature for one whole day and night to cause sufficient reaction. Thereafter, concentration adjustment was conducted by addition of pure water, to obtain a yellow transparent peroxotitanic acid solution (e) (solid content concentration: 1 wt %).

(8) Tin chloride pentahydrate was dissolved in pure water, to obtain 10 wt % aqueous tin chloride solution (f).

(9) The autoclave of volume 500 mL was charged with 350 mL of the aqueous peroxotitanic acid solution (e) obtained in (7) and 10 mL of the aqueous tin chloride solution (f) obtained in (8), and the resulting mixture was subjected to the hydrothermal treatment under 150° C. for 120 min. Thereafter, the reaction mixture in the autoclave was discharged through the sampling pipe into the vessel held in 25° C. water bath, thereby effecting rapid cooling and stopping the reaction, to obtain a titanium oxide microparticle dispersion.

The titanium oxide microparticle dispersion obtained in (9) was admixed with the aqueous iron sulfate solution (d) obtained in (5) so as to obtain the metal iron concentration of 0.3 wt %, to obtain a visible-light-responsive titanium oxide microparticle dispersion (C) of the present invention which contains the titanium oxide of 1 wt % and contains the titanium peroxotitanium component of concentration 2 wt % based on the titanium oxide. The mean particle diameter of the titanium oxide microparticles in the dispersion thus obtained was measured to be 31 nm.

Comparative Example 1

A titanium oxide microparticle dispersion (D) was obtained in the same manner as in Example 1, except that addition of the aqueous iron sulfate was not conducted. The means particle diameter of the titanium oxide microparticles in the dispersion thus obtained was measured to be 9 nm.

Comparative Example 2

(11) The autoclave of volume 500 mL was charged with 400 mL of the aqueous peroxotitanic acid (e) obtained in Example 3, and the solution was subjected to the hydrothermal treatment under 150° C. for 120 min. Thereafter, the reaction mixture in the autoclave was discharged through the sampling pipe into the vessel held in 25° C. water bath, thereby effecting rapid cooling and stopping the reaction, to obtain a titanium oxide microparticle dispersion.

The titanium oxide microparticle dispersion obtained in (11) was admixed with the aqueous iron sulfate solution (d) obtained in (5) so as to obtain the metal iron concentration of 0.25 wt % based on the titanium oxide, to obtain a titanium oxide microparticle dispersion (E). The mean particle diameter of the titanium oxide microparticles in the dispersion thus obtained was measured to be 30 nm.

Comparative Example 3

A titanium oxide microparticle dispersion (F) was obtained in the same manner as in Example 1, except that the hydrothermal treatment temperature was 60° C. The mean particle diameter of the titanium oxide microparticles in the dispersion thus obtained could not be measured, since the amount of the particles produced was too small. In this Comparative Example, the amount of the titanium oxide microparticles was extremely small, and, therefore, measurements of other properties were not conducted.

The silica binder (colloidal silica, product name: "SNOWTEX 20" made by Nissan Chemical Industries, Ltd.) was added to each of the dispersions produced in Examples 1 to 3 and Comparative Examples 1 and 2 in $TiO_2/SiO_2$ ratio of 1.5. Thereafter, each of the dispersions was applied to the glass plate by use of the dip coater, and was dried to form a photocatalyst thin film of thickness 150 nm, thereby obtaining an evaluation sample.

Table 1 collectively shows the reaction conditions, and the evaluation results of mean particle diameter, transparency of the photocatalyst thin film, water contact angle after irradiation with light from the fluorescent lamp for five hours in the self-cleaning performance test, and gas decomposition ratio after irradiation with light from the fluorescent lamp for 90 min in the acetaldehyde gas decomposition test, for each of Examples and Comparative Examples.

As seen from the results of Comparative Example 1, a sufficient visible-light activity cannot be obtained when the iron component is not added.

As seen from the results of Comparative Example 2, a sufficient visible-light activity cannot be obtained when the tin component is not added.

As seen from the results of Comparative Example 3, the conversion to titanium oxide is very slow when the reaction temperature is too low.

As seen from the results of Examples 1 to 3, where the iron component and the tin component are contained in the dispersion, good decomposition of acetaldehyde and oleic acid under irradiation with light from the fluorescent lamp, or good photocatalytic activity is attained.

TABLE 1

| | | Tin-containing peroxotitanic acid aqueous solution | Ti/Sn (molar ratio) | Iron-containing aqueous solution | Amount of iron added (wt %) | Hydrothermal treatment conditions | | Evaluation results | | | |
|---|---|---|---|---|---|---|---|---|---|---|---|
| | | | | | | Temp. (° C.) | Time (min) | Mean particle diameter (nm) | Thin film transparency | Water contact angle (°) | Gas decomposition (%) |
| Example | 1 | (a) | 20 | (b) | 0.2 | 200 | 120 | 20 | ○ | 4 | 32 |
| | 2 | (c) | 10 | (d) | 0.25 | 150 | 120 | 24 | ○ | 4 | 30 |
| | 3 | (e) | 50 | (d) | 0.3 | 150 | 120 | 31 | Δ | 6 | 25 |

TABLE 1-continued

|  |  | Tin-containing peroxotitanic acid aqueous solution | Ti/Sn (molar ratio) | Iron-containing aqueous solution | Amount of iron added (wt %) | Hydrothermal treatment conditions | | Evaluation results | | | |
|---|---|---|---|---|---|---|---|---|---|---|---|
|  |  |  |  |  |  | Temp. (° C.) | Time (min) | Mean particle diameter (nm) | Thin film transparency | Water contact angle (°) | Gas decomposition (%) |
| Comparative Example | 1 | (a) | 20 | — | — | 200 | 120 | 9 | ○ | 20 | 7 |
|  | 2 | (e) | — | (d) | 0.25 | 150 | 120 | 30 | Δ | 18 | 7 |
|  | 3 | (a) | 20 | (b) | 0.2 | 60 | 120 | PWNF | — | — | — |

PWNF: Particles were not formed.

Example 4

(12) Tin(IV) chloride was added to 36 wt % aqueous solution of titanium(IV) chloride so as to obtain Ti/Sn (molar ratio) of 20, and after diluting the aqueous solution with pure water by the dilution ratio of 10 times, 10 wt % aqueous ammonia was gradually added to the aqueous solution to effect neutralization and hydrolysis, thereby obtaining a precipitate of titanium hydroxide. The pH of the solution in this instance was 9. The precipitate of titanium hydroxide thus obtained was subjected to the deionization treatment by repeating pure water addition and decantation. 30 wt % aqueous solution of hydrogen peroxide was added to the titanium hydroxide precipitate after the deionization treatment so as to obtain hydrogen peroxide/titanium hydroxide ratio (molar ratio) of not less than 2.5, followed by stirring at room temperature for one whole day and night to cause sufficient reaction. Thereafter, concentration adjustment was conducted by addition of pure water, to obtain a yellow transparent tin-containing peroxotitanic acid solution (g) (solid content concentration: 1 wt %).

(13) Copper sulfate was dissolved in pure water, to obtain 1 wt % aqueous copper sulfate solution (h).

(14) The autoclave of volume 500 mL was charged with 400 mL of the tin-containing aqueous peroxotitanic acid solution (g) obtained in (12), and the solution was subjected to the hydrothermal treatment under 200° C. and 1.6 MPa for 120 min. Thereafter, the reaction mixture in the autoclave was discharged through the sampling pipe into the vessel held in 25° C. water bath to effect rapid cooling, thereby stopping the reaction, to obtain a titanium oxide microparticle dispersion.

The titanium oxide microparticle dispersion obtained in (14) was admixed with the aqueous copper sulfate solution (h) obtained in (13) so as to obtain the metal copper concentration of 0.2 wt % based on the titanium oxide. The admixture was subjected to the hydrothermal treatment under 150° C. for 30 min, to obtain a visible-light-responsive titanium oxide microparticle dispersion (G) of the present invention which contains the titanium oxide of 1 wt % and contains the peroxotitanium component of concentration 1 wt % based on the titanium oxide. The mean particle diameter of the titanium oxide microparticles in the dispersion thus obtained was measured to be 12 nm.

Example 5

(15) Tin(IV) chloride was added to 36 wt % aqueous solution of titanium(IV) chloride so as to obtain Ti/Sn (molar ratio) of 5, and after diluting the aqueous solution with pure water by the dilution ratio of 10 times, 10 wt % aqueous ammonia was gradually added to the diluted solution to effect neutralization and hydrolysis, thereby obtaining a precipitate of titanium hydroxide. The pH of the solution in this instance was 9. The precipitate of titanium hydroxide thus obtained was subjected to the deionization treatment by repeating pure water addition and decantation. 30 wt % aqueous solution of hydrogen peroxide was added to the titanium hydroxide precipitate after the deionization treatment so as to obtain hydrogen peroxide/titanium hydroxide ratio (molar ratio) of not less than 2.5, followed by stirring at room temperature for one whole day and night to cause sufficient reaction. Thereafter, concentration adjustment was conducted by addition of pure water, to obtain a yellow transparent tin-containing peroxotitanic acid solution (i) (solid content concentration: 1 wt %).

(16) Copper nitrate was dissolved in pure water, to obtain 1 wt % aqueous copper nitrate solution (j).

(17) The autoclave of volume 500 mL was charged with 400 mL of the tin-containing aqueous peroxotitanic acid solution obtained in (15), and the solution was subjected to the hydrothermal treatment under 150° C. and 0.5 MPa for 120 min. Thereafter, the reaction mixture in the autoclave was discharged through the sampling pipe into the vessel held in 25° C. water bath to effect rapid cooling, thereby stopping the reaction, to obtain a titanium oxide microparticle dispersion.

The titanium oxide microparticle dispersion obtained in (17) was admixed with the aqueous copper nitrate solution (j) obtained in (16) so as to obtain the metal copper concentration of 0.25 wt % based on the titanium oxide, thereby obtaining a visible-light-responsive titanium oxide microparticle dispersion (H) which contains the titanium oxide of 1 wt % and contains the peroxotitanium component of concentration 2 wt % based on the titanium oxide. The mean particle diameter of the titanium oxide microparticles in the dispersion thus obtained was measured to be 10 nm.

Example 6

(18) After 36 wt % aqueous solution of titanium(IV) chloride was diluted with pure water by the dilution ratio of 10 times, 10 wt % aqueous ammonia was gradually added to the diluted solution to effect neutralization and hydrolysis, thereby obtaining a precipitate of titanium hydroxide. The pH of the solution in this instance was 10. The precipitate of titanium hydroxide thus obtained was subjected to the deionization treatment by repeating pure water addition and decantation. 30 wt % aqueous solution of hydrogen peroxide was added to the titanium hydroxide precipitate after the deionization treatment so as to obtain hydrogen peroxide/titanium hydroxide ratio (molar ratio) of not less than 2.5, followed by stirring at room temperature for one whole day and night to cause sufficient reaction. Thereafter, concentration adjustment was conducted by addition of pure water, to thereby obtain a yellow transparent peroxotitanic acid solution (k) (solid content concentration: 1 wt %).

(19) Tin chloride pentahydrate was dissolved in pure water, to obtain 10 wt % aqueous tin chloride solution (m).

(20) The autoclave of volume 500 mL was charged with 350 mL of the aqueous peroxotitanic acid solution (k) obtained in (18) and 10 mL of the aqueous tin chloride solution (m) obtained in (19), and the resulting solution was subjected to the hydrothermal treatment under 150° C. for 120 min. Thereafter, the reaction mixture in the autoclave was discharged through the sampling pipe into the vessel held in 25° C. water bath to effect rapid cooling, thereby stopping the reaction, to obtain a titanium oxide microparticle dispersion.

The titanium oxide microparticle dispersion obtained in (20) was admixed with the aqueous copper sulfate solution (j) obtained in (16) so as to obtain the metal copper concentration of 0.3 wt % based on the titanium oxide, thereby obtaining a visible-light-responsive titanium oxide microparticle dispersion (I) of the present invention which contains the titanium oxide of 1 wt % and contains the peroxotitanium component of concentration 2 wt % based on the titanium oxide. The mean particle diameter of the titanium oxide microparticles in the dispersion thus obtained was measured to be 25 nm.

Comparative Example 4

(21) A titanium oxide microparticle dispersion (J) was obtained in the same manner as in Example 4, except that addition of the aqueous copper sulfate solution was not conducted. The mean particle diameter of the titanium oxide microparticles in the dispersion thus obtained was measured to be 9 nm.

Comparative Example 5

(22) The autoclave of volume 500 mL was charged with 400 mL of the aqueous peroxotitanic acid solution obtained in Example 6, and the solution was subjected to the hydrothermal treatment under 150° C. for 120 min. Thereafter, the reaction mixture in the autoclave was discharged through the sampling pipe into the vessel held in 25° C. water bath to effect rapid cooling, thereby stopping the reaction, to obtain a titanium oxide microparticle dispersion.

The titanium oxide microparticle dispersion obtained in (22) was admixed with the aqueous copper sulfate solution (j) obtained in (16) so as to obtain the metal copper concentration of 0.25 wt % based on the titanium oxide, to obtain a titanium oxide microparticle dispersion (K). The mean particle diameter of the titanium oxide microparticles in the dispersion thus obtained was measured to be 25 nm.

Comparative Example 6

A titanium oxide microparticle dispersion (L) was obtained in the same manner as in Example 4, except that the hydrothermal treatment temperature was 60° C. The mean particle diameter of the titanium oxide microparticles in the dispersion thus obtained was not measurable, since the amount of the particles formed was so small. In this comparative example, the amount of the titanium oxide microparticles was extremely small, and therefore, measurements of other properties were not conducted.

The silica binder (colloidal silica, product name: "SNOWTEX 20" made by Nissan Chemical Industries, Ltd.) was added to each of the dispersions produced in Examples 4 to 6 and Comparative Examples 4 and 5 in $TiO_2/SiO_2$ ratio of 1.5. Thereafter, each of the dispersions was applied to the glass plate by use of the dip coater, and was dried to form a photocatalyst thin film of thickness 150 nm, thereby obtaining an evaluation sample.

Table 2 collectively shows the reaction conditions, and the evaluation results of mean particle diameter, transparency of the photocatalyst thin film, water contact angle after irradiation with light from the fluorescent lamp for five hours in the self-cleaning performance test, and gas decomposition ratio after irradiation with light from the fluorescent lamp for 90 min in the acetaldehyde gas decomposition test, for each of Examples and Comparative Examples.

As seen from the results of Comparative Example 4, a sufficient visible-light activity cannot be obtained when the copper component is not added.

As seen from the results of Comparative Example 5, a sufficient visible-light activity cannot be obtained when the tin component is not added.

As seen from the results of Comparative Example 6, the conversion to titanium oxide is very slow when the reaction temperature is too low.

As seen from the results of Examples 4 to 6, where the copper component and the tin component are contained in the dispersion, good decomposition of acetaldehyde and oleic acid under irradiation with light from the fluorescent lamp, or good photocatalytic activity is attained.

TABLE 2

| | | Tin-containing peroxotitanic acid aqueous solution | Ti/Sn (molar ratio) | Copper-containing aqueous solution | Amount of copper added (wt %) | Hydrothermal treatment conditions Temp. (° C.) | Time (min) | Evaluation results Mean particle diameter (nm) | Thin film transparency | Water contact angle (°) | Gas decomposition (%) |
|---|---|---|---|---|---|---|---|---|---|---|---|
| Example | 4 | (g) | 20 | (h) | 0.2 | 200 | 120 | 12 | ○ | 2 | 51 |
| | 5 | (i) | 10 | (i) | 0.25 | 150 | 120 | 10 | ○ | 2 | 43 |
| | 6 | (k) | 50 | (i) | 0.3 | 150 | 120 | 25 | Δ | 4 | 41 |
| Comparative | 4 | (g) | 20 | — | — | 200 | 120 | 9 | ○ | 20 | 7 |
| Example | 5 | (k) | — | (i) | 0.25 | 150 | 120 | 25 | Δ | 28 | 5 |
| | 6 | (g) | 20 | (h) | 0.2 | 60 | 120 | PWNF | — | — | — |

PWNF: Particles were not formed.

INDUSTRIAL APPLICABILITY

The titanium oxide microparticle dispersion according to the present invention, with a binder added thereto, is useful for producing a photocatalyst thin film by application thereof to various substrates formed of an inorganic material such as glass and metal or formed of an organic material such as polymer film (e.g., PET film), and is particularly useful for producing a transparent photocatalyst thin film on a polymer film.

The invention claimed is:

1. A process for producing a visible-light-responsive titanium oxide microparticle dispersion comprising the steps of:
   (1) producing an aqueous solution of peroxotitanic acid containing a tin compound from a raw material titanium compound, a tin compound and a hydrogen peroxide;
   (2) heating the aqueous solution of peroxotitanic acid containing the tin compound to 80 to 250° C. under a pressure of 0.01 to 4.5 MPa to produce a titanium oxide microparticle dispersion containing a peroxotitanium component and a tin component; and
   (3) adding an iron compound and/or a copper compound to the titanium oxide microparticle dispersion to cause a reaction of the iron compound and/or the copper compound with the dispersion, so as to obtain the visible-light-responsive titanium oxide microparticle dispersion.

2. The process for producing a visible-light-responsive titanium oxide microparticle dispersion according to claim 1, wherein the obtained visible-light-responsive titanium oxide microparticle dispersion comprises an aqueous dispersion solvent and titanium oxide microparticles dispersed in the aqueous dispersion solvent and further comprises a peroxotitanium component, a tin component, and an iron component and/or a copper component, wherein the content of the peroxotitanium component is 0.1 to 20 wt % based on titanium oxide.

3. The process for producing a visible-light-responsive titanium oxide microparticle dispersion according to claim 2, wherein the content of the iron component in terms of metal iron is 0.01 to 5 wt % based on titanium oxide.

4. The process for producing a visible-light-responsive titanium oxide microparticle dispersion according to claim 2, wherein the content of the copper component in terms of metal copper is 0.01 to 5 wt % based on titanium oxide.

5. The process for producing a visible-light-responsive titanium oxide microparticle dispersion according to claim 2, wherein the content of the tin component in terms of molar ratio (Ti/Sn) between the tin component and titanium oxide is from 1 to 1000.

6. The process for producing a visible-light-responsive titanium oxide microparticle dispersion according to claim 2, wherein the titanium oxide microparticles have a 50% cumulative distribution diameter ($D_{50}$) measured by a dynamic scattering method of not more than 50 nm.

* * * * *